United States Patent
Tsuji

(10) Patent No.: US 9,020,315 B2
(45) Date of Patent: Apr. 28, 2015

(54) OPTICAL SHEET, BACKLIGHT UNIT USING THE SAME AND METHOD FOR PRODUCING THE SAME

(75) Inventor: Takahiro Tsuji, Osaka (JP)

(73) Assignee: Keiwa Inc., Osaka (JP)

( * ) Notice: Subject to any disclaimer, the term of this patent is extended or adjusted under 35 U.S.C. 154(b) by 4 days.

(21) Appl. No.: 13/613,818

(22) Filed: Sep. 13, 2012

(65) Prior Publication Data

US 2013/0242598 A1      Sep. 19, 2013

(30) Foreign Application Priority Data

Sep. 15, 2011   (JP) ................................ 2011-202462

(51) Int. Cl.
| | |
|---|---|
| *G02B 6/04* | (2006.01) |
| *F21V 8/00* | (2006.01) |
| *G02F 1/1335* | (2006.01) |
| *G02B 5/02* | (2006.01) |

(52) U.S. Cl.
CPC ............ *G02B 6/0078* (2013.01); *G02F 1/1336* (2013.01); *G02B 6/0005* (2013.01); *G02B 6/0065* (2013.01); *G02B 5/0221* (2013.01); *G02B 6/0025* (2013.01)

(58) Field of Classification Search
USPC .............. 362/97.1, 97.2, 97.4, 554, 559, 561; 385/120; 427/163.2, 180, 156, 420, 427/264
See application file for complete search history.

(56) References Cited

U.S. PATENT DOCUMENTS

| | | | | |
|---|---|---|---|---|
| 7,763,272 | B2 * | 7/2010 | Offermann et al. ........... | 424/426 |
| 2005/0151894 | A1 * | 7/2005 | Katsuda et al. .................. | 349/58 |
| 2007/0253060 | A1 * | 11/2007 | Yoshioka et al. ............. | 359/500 |
| 2008/0123028 | A1 * | 5/2008 | Harada .......................... | 349/96 |
| 2009/0015781 | A1 * | 1/2009 | Shimodaira et al. .......... | 349/158 |
| 2010/0208165 | A1 * | 8/2010 | Kamada ......................... | 349/64 |
| 2010/0231840 | A1 * | 9/2010 | Saida et al. ................... | 349/153 |
| 2011/0051044 | A1 * | 3/2011 | Segawa .......................... | 349/64 |
| 2013/0168138 | A1 * | 7/2013 | Yamazaki et al. ............ | 174/253 |

FOREIGN PATENT DOCUMENTS

| | | |
|---|---|---|
| JP | 8-184704 | 7/1996 |
| JP | 10-062785 | 3/1998 |
| JP | 2002-221609 | 8/2002 |
| JP | 2004-198743 | 7/2004 |
| KR | 2001-0066917 | 7/2001 |
| TW | 200807029 | 2/2008 |
| WO | WO-03/032074 | 4/2003 |

\* cited by examiner

*Primary Examiner* — John A Ward
(74) *Attorney, Agent, or Firm* — Jordan and Hamburg LLP

(57) ABSTRACT

Provided is an optical sheet capable of exhibiting superior optical function, and a high-quality backlight unit using the same. The optical sheet includes a transparent substrate layer, and an optical function layer having a plurality of fibers protruding from one surface side of the substrate layer. The optical function layer preferably includes an adhesive portion joining the plurality of fibers to the substrate layer. The adhesive portion is preferably laminated entirely on the one surface side of the substrate layer. The adhesive portion is preferably formed from acryl emulsion adhesives. The refractive index of the fiber is preferably no less than 1.3 and no greater than 1.8. The density of the fiber per unit area in the plane direction of the substrate layer is preferably no less than 100 fibers/cm$^2$ and no greater than 5000 fibers/cm$^2$.

12 Claims, 5 Drawing Sheets

OPTICAL SHEET, BACKLIGHT UNIT USING THE SAME AND METHOD FOR PRODUCING THE SAME

FIELD OF THE INVENTION

The present invention relates to an optical sheet, a backlight unit using the same and a method for producing the same.

DISCUSSION OF THE BACKGROUND

Backlight systems, which illuminate a liquid crystal layer from behind, are in widespread use as transmissive liquid crystal display device, and the transmissive liquid crystal display device is equipped with an edge light type (side light type) backlight unit, an immediate beneath type backlight unit or the like on the inferior face side of the liquid crystal layer. The edge light type backlight unit 40 is generally equipped with a lamp 41 as a light source, an optical waveguide plate 42 in the form of a rectangular plate arranged with its edge aligned with the lamp 41, and a plurality of optical sheets 43 superposed on the front face side of the optical waveguide plate 42, as shown in FIG. 7. LEDs (light emitting diodes) and cold-cathode tubes and the like are used as the lamp 41 as the light source, and the LEDs are currently gaining widespread use from the viewpoint of the size reduction and energy saving and the like. The optical sheet 43 has optical functions such as diffusion and refraction of the transmitted rays of light and the like, and as the optical sheet 43, (1) a light diffusion sheet 44 which is disposed on the front face side of the optical waveguide plate 42 and primarily has the light diffusion function, and (2) a prism sheet 45 which is disposed on the front face side of the light diffusion sheet 44 and has the refraction function toward a normal direction side, and the like are utilized.

Although not shown in FIG. 7, there are also some backlight units in which much more optical sheets 43 including the light diffusion sheet and the prism sheet are disposed, considering the optical waveguide characteristics of the optical waveguide plate 42 and the optical functions of the optical sheet 43 and the like, as described above.

The functions of the backlight unit 40 will be explained; first, the rays of light entering the optical waveguide plate 42 from the lamp 41 are reflected on reflection dots or a reflection sheet (not shown) on the back face of the optical waveguide plate 42 as well as on each lateral face, and are output from the front face of the optical waveguide plate 42. The rays of light output from the optical waveguide plate 42 enter a light diffusion sheet 44, and are diffused and output from its front face. The rays of light output from the front face of the light diffusion sheet 44 enter a prism sheet 45, are refracted by a plurality of protruding prism portions formed on the front face toward a normal direction and output, and illuminate the entire liquid crystal layer not shown) located further above the prism sheet 45.

The light diffusion sheet 44 substantially uniformly disperses the transmitted rays of light, and is used for the purpose of uniformalization of luminance, luminance heightening in the front direction and the like due to its light diffusibility. As the light diffusion sheet 44, there is commonly used a light diffusion sheet (see, for example, Japanese Unexamined Patent Application, Publication No. 2004-198743) that includes a substrate layer 46 made from a synthetic resin, and an optical layer 47 laminated on the front face of the substrate layer 46, in which the optical layer 47 is made form a blended material of spherical resin beads 50 in a binder 49, as shown in FIG. 7(b).

However, in order to increase light diffusibility for the purpose of the uniformalization of luminance and the like, a blended amount of the resin beads 50 in the resin-beads-coating type light diffusion sheet 44 is needed to be increased; however, such an increase in the blended amount of the resin beads 50 leads to reduction of face luminance. In other words, in the beads-coating type light diffusion sheet 44, there is a trade-off relationship between the light diffusibility and the face luminance.

SUMMARY OF THE INVENTION

The present invention was made in view of the above-mentioned situation. An object of the present invention is to provide an optical sheet having high light diffusibility and face luminance and being capable of exerting superior optical functions, and a high-quality backlight unit using the same.

An aspect of the invention made for solving the above-mentioned problems relates to an optical sheet, including:
a transparent substrate layer; and
an optical function layer including a plurality of fibers protruding from one surface side of the substrate layer.

The optical sheet is provided with a transparent substrate layer, and an optical, function layer including a plurality of fibers protruding from one surface side of the substrate layer. Thus, the rays of light that has passed through one surface side of the substrate layer, and entered the optical function layer diffuses through reflection and refraction on the lateral face of the plurality of fibers. In addition, the rays of light that have entered the other end face of the plurality of fibers are output from one end face to the other surface side, in which the fibers function like fiber optics. Therefore, the optical sheet exerts high directional diffusion function of condensing the rays of light in a normal direction while diffusing the rays of light toward the other surface side.

The optical function layer preferably includes an adhesive portion joining the plurality of fibers to the substrate layer. By joining the substrate layer and the plurality of fibers via the adhesive portion in this manner, it is possible to join the plurality of fibers to the substrate layer more strongly, and to prevent detachment of the fibers.

The adhesive portion is preferably laminated entirely on the one surface side of the substrate layer. By laminating the adhesive portion entirely on the one surface side of the substrate layer in this manner, it is possible for the plurality of fibers to protrude from the entirety of the one surface side of the substrate layer. As a result, the optical sheet can uniformly exhibit the above-mentioned directional diffusion function over the entire surface of the surface.

The one surface side of the substrate layer preferably includes a region in which the adhesive portion is discretely provided. Based on the fact that the one surface side of the substrate layer includes a region in which the adhesive portion is discretely provided, the directional diffusion function can be exerted as desired as a function of the region of the substrate layer. In addition, in the region in which the adhesive portion is discretely provided, the amount of the adhesive coated can be reduced, compared to when the adhesive is coated entirely over the region.

The adhesive portion is preferably formed from an acryl emulsion adhesive. The acryl emulsion adhesive is transparent, is easily coated over the substrate layer and has low risk of ignition. Thus, it can improve light transmittance and processibility of the optical sheet.

The refractive index of the fibers is preferably no less than 1.3 and no greater than 1.8. Setting the refractive index of the plurality of fibers protruding from the one surface side of the substrate byes in the above-described range in this way can further enhance the directional diffusion function of the optical sheet.

The density of the fibers per unit area in the plane direction of the substrate layer is preferably no less than 100 fibers/cm$^2$ and no greater than 5000 fibers/cm$^2$. Setting the density of the fibers per unit area in the plane direction of the substrate layer in the above-described range in this way can suppress an Increase in production cost, while maintaining the directional diffusion function of the optical sheet.

The mean diameter of the fibers is preferably no less than 0.1 μm and no greater than 50 μm, their mean length is preferably no less than 1 μm and no greater than 1 mm, and the ratio of the mean length to the mean diameter is preferably no less than 2 and no greater than 50. Setting the mean diameter and mean length of the fibers as well as the ratio of the mean length to the mean diameter in the above-described ranges in this way enables thin and light modeling of the liquid crystal display devices employing the optical sheet, while maintaining the directional diffusion function of the optical sheet.

The total light transmittance of the optical sheet is preferably no less than 20%. Setting the total light transmittance in the above-described range in this way can improve the luminance of the liquid crystal display devices employing the optical sheet.

The haze value of the optical sheet 1 is preferably no less than 50%. Setting the haze value in the above-described range in this way further improves the directional diffusion function of the optical sheet, and can suppress lack in uniformity of the luminance of the liquid crystal display devices employing the optical sheet.

A plurality of fibers preferably further protrude from the other surface side of the substrate layer. Based on the fact that the plurality of fibers also protrude from the other surface side of the substrate layer in this way, it is possible to improve the directional diffusion function. Moreover, the plurality of fibers thus provided can exhibit a sticking prevention function toward other members superposed on the other surface side.

Furthermore, another aspect of the invention made for solving the above-mentioned problems relates to a backlight unit for a liquid crystal display device, the backlight unit directing rays of light, emitted from a lamp to a liquid crystal displaying part, characterized in that the backlight unit is provided with the optical sheet according to the present invention.

The backlight unit can allow the quality improvement of the liquid crystal display devices through high directional diffusion function possessed by the optical sheet.

Furthermore, another aspect of the invention made for solving the above-mentioned problems relates to a method for producing an optical sheet, the method including:

an adhesive coating step of coating an adhesive over one surface side of a substrate layer, a fiber flocking step of flocking a plurality of fibers on the adhesive-coated surface via an electrostatic flocking processing method, an adhesive curing step of curing the adhesive after the flocking, and an excess fiber elimination step of eliminating excess fibers from the sheet main body after curing of the adhesive.

According to the method for producing an optical sheet, through the above-described steps, the plurality of fibers can be flocked on the desired surface of the optical sheet, and moreover, the plurality of fibers can be strongly stuck via the adhesive. Therefore, the optical sheet obtained by the method for production exerts high directional diffusion function.

The term "optical function layer" used herein refers to a layer including as its components a plurality of fibers, an air existing among the plurality of fibers, and the like. The term "adhesive portion" used herein refers to a cured material of the adhesive coated over the sheet main body. The term "total light transmittance" is a value measured in accordance with JIS K7361. The term "haze value" is a value measured in accordance with JIS K7105.

As explained above, the optical sheet according to the present invention can exhibit superior optical function. Moreover, the backlight unit according to the present invention includes an optical sheet with high optical functions, which can lead to quality improvement of liquid crystal display devices.

DESCRIPTION OF EMBODIMENTS

Hereinafter, an embodiment of the present invention will be explained in detail with reference to accompanying Figures, if appropriate.

Figure 1:
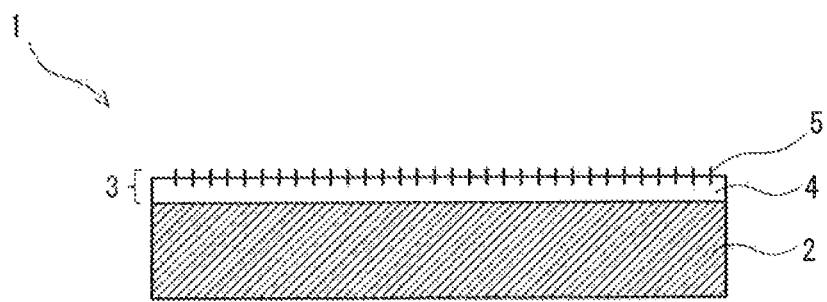
FIG. 1 is a schematic cross sectional view of the optical sheet according to one embodiment of the present invention.

An optical sheet 1 shown in FIG. 1 is a so-called light diffusion sheet used for a backlight unit, and is provided with a substrate layer 2, and an optical function layer 3 disposed on the front face side (liquid crystal display device side) of the substrate layer 2. The optical function layer 3 has an adhesive portion 4, and a plurality of fibers 5 protruding from the substrate layer 2 via the adhesive portion 4.

<Substrate Layer>

The substrate layer 2 is composed of a plate-like member portion 4 formed (made) from transparent synthetic resin or glass. The term "transparent" used herein encompasses, aside from "colorless and transparent", "colored and transparent", and "translucent", but particular preference is given to being "colorless and transparent". The synthetic resin used in the substrate layer 2 can include, without particularly limitation, for example, polyethylene terephthalate, polyethylene naphthalate, acrylic resins, polycarbonates, polystyrene, polyolefins, cellulose acetate, weather resistance vinyl chloride and the like. Among these, polyethylene terephthalate having excellent transparency and high strength are preferable, and polyethylene terephthalate resins with improved deflection performance are particularly preferable.

The substrate layer 2 preferably contains an antistatic agent. Due to the substrate layer 2 containing the antistatic agent, the substrate layer 2 can be prevented from being charged with static electricity generated in the plurality of fibers 5 carried on the optical function layer 3. The antistatic agent is not particularly limited, and well-known antistatic agents, for example, anionic antistatic agents such as alkylsulfates and alkylphosphates, cationic antistatic agents such as quaternary ammonium salts and imidazoline compounds, nonionic antistatic agents such as polyethylene glycol-based materials, polyoxyethylene sorbitanmonostearic acid esters and ethanolamides, polymeric antistatic agents such as polyacrylic acid can be employed. Among these, the cationic antistatic agents are preferable because of their comparatively large antistatic effect, and a small amount of the cationic antistatic agents is sufficient to exert the antistatic effect. It is to be noted that the antistatic agent is contained and uniformly dispersed in the substrate layer 2 in such an appropriate amount that the fibers 5 can be provided so as to protrude evenly from the substrate layer 2 in an electrostatic flocking processing step of the fibers 5, which will be described below.

The an thickness of the substrate layer 2 may be, without particular limitation, for example, no less than 10 μm and no greater than 500 μm, preferably no less than 35 μm and no greater than 250 μm, particularly preferably no less than 50 μm and no greater than 188 μm. If the thickness of the substrate layer 2 is less than the above-described range, some disadvantages may arise, such as generation of easy-to-curl substrate layer 2, difficult handling or the like at the time of coating a resin composition to form the adhesive portion 4. In contrast, the thickness of the substrate layer 2 is greater than the above-described range, the luminance of the liquid crystal display device may be lowered, or the thickness of the backlight unit may become large, which will conflict with requirement of reduction in thickness of the liquid crystal display devices.

<Adhesive Portion>

The adhesive portion 4 is formed of an adhesive coated over an entire smooth front face of the substrate layer 2. The adhesive portion 4 allows the plurality of fibers 5 to protrude from the entire front face of the substrate layer 2. In addition, the adhesive portion 4 enables a basal part of the respective fibers 5 to be joined more strongly to the substrate layer 2, which prevents detachment of the fibers 5.

The adhesive forming the adhesive portion 4 is not particularly limited, and water soluble adhesives, solvent type adhesives, ultraviolet ray curing adhesives and the like can be employed. Among these, the water soluble adhesives are preferably employed, since they are easily coated over the sheet and have low risk of ignition. Specific examples of the water soluble adhesives include, for example, adhesives such as acrylic emulsions, urethane emulsions, epoxy emulsions, vinyl acetate emulsions, and the acrylic emulsion adhesives are particularly preferable from the viewpoint, of their sprayability and frictional property. Additionally, specific examples of the solvent type adhesives include, for example, adhesives such as epoxy resins, acrylic resins, urethane resins, polyester resins, vinyl, acetate resins, vinyl chloride resins, phenol resins and the like, and the epoxy resins are particularly preferable from the viewpoint of their heat resistance. Furthermore, transparent adhesives are preferable from the viewpoint of increasing permeability and transmittivity of rays of light, and colorless transparent adhesives are particularly preferable. In addition, when attention is paid to an environmental aspect, adhesives that emit less volatile organic compounds (VOC) (low VOC adhesives) are preferable. It is to be noted that the thickness of the adhesive portion 4 is not particularly limited, but a range of thickness of the adhesive portion 4 in which the fibers 5 are stuck but hardly buried therein is preferable, and the thickness of the adhesive portion 4 after being cured of no less than 0.1 μm and no greater than 10 μm is preferable.

The refractive index ratio of the substrate layer 2 to the adhesive portion 4 is preferably no less than 0.95 and no greater than 1.0.5, and particularly preferably no less than 0.97 and no greater than 1.03. Setting the refractive index ratio of the substrate layer 2 to the adhesive portion 4 in the above-described range reduces diffused reflection at the interface between the substrate layer 2 and the adhesive portion 4 and the like, and thereby the total light transmittance of the optical sheet 1 can be improved.

<Fibers>

The plurality of fibers 5 are substantially uniformly planted in the adhesive portion 4, and protrude from the adhesive portion 4 so that each fiber is substantially parallel to each other.

A method for flocking the plurality of fibers 5 is not particularly limited so long as the method can allow the plurality of fibers 5 to protrude from the front to side of the substrate layer 2, but the use of an electrostatic flocking processing method is preferable. By using the electrostatic flocking processing method, it is possible to flock and stick the plurality of fibers 5 to the front, face of the substrate layer 2 at a desired angle, and to adjust the density of the flocked fibers 5. In particular, it is preferable to flock and stick the plurality of fibers 5 substantially perpendicularly to the front face of the substrate layer 2. Flocking the plurality of fibers 5 substantially perpendicularly in this manner can suppress collapse of the fibers 5 before the adhesive joining the basal part of the fiber 5 has cured. In addition, the electrostatic flocking processing method includes, for example, a processing method in which flocking is performed by setting a sheet having an uncured adhesive so as to form a counter electrode relative to one electrode, applying DC (direct-current) high voltage to the counter electrode, forcing a plurality of fibers supplied between the electrodes to fly along lines of electric force by means of coulomb force, and sticking the basal part of the fiber into the front face of the sheet, and the like. Such an electrostatic flocking processing method is not particularly limited so long as any well-known electrostatic flocking processing method is employed.

The fibers 5 are not particularly limited, and natural fibers and chemical fibers can be employed. The natural fibers include, for example, cotton fibers, hemp fibers, cellulose fibers, and the like. The chemical fibers include, for example, rayon fibers, polyester fibers, polyolefin-based fibers (polyethylene-based fibers, polypropylene-based fibers, and the like), polyamide fibers (aliphatic polyamide fibers, aromatic polyamide fibers, and the like), acrylic fibers, polyacrylonitrile-based fibers, polyvinylalcohol fibers, polyimide fibers, carbon fibers, silicone fibers, fluorine-based fibers, and the like. The chemical fibers can be formed into shapes having no curl, and therefore can be preferably used in the electrostatic flocking processing method. In addition, transparent fibers are preferable from the viewpoint of increasing permeability and transmittivity of rays of light, and colorless transparent fibers are more preferable. In addition, among the fibers, flexible fibers other than glass fibers are preferable. The use of such flexible fibers in the optical sheet 1 makes it possible to prevent the occurrence of damages upon the contact with other members.

The lower limit of the refractive index of the fibers 5 is preferably 1.3, more preferably 1.4, and particularly preferably 1.45. On the other hand, the upper limit of the refractive index of the fibers 5 is preferably 1.8, more preferably 1.7, and particularly preferably 1.6. If the refractive index of the fibers 5 is less than the above-described lower limit, the effect oil the diffraction of the rays of light is not sufficiently achieved. In contrast, if the refractive index of the fibers 5 is greater than the upper limit, the proportion of reflection components may become large, and hence loss of the rays of light may become large, which may result in the reduction of the light transmittivity of the optical sheet 1.

The refractive index ratio of the adhesive portion 4 to the fibers 5 is preferably no less than 0.95 and no greater than 1.05, and particularly preferably no less than 0.97 and no greater than 1.03. Setting the refractive index ratio of the adhesive portion 4 to the fibers 5 in the above-described range reduces diffused, reflection at the interface between the adhesive portion 4 and the fibers 5 and the like, and thereby the total light transmittance of the optical sheet 1 can be improved.

The lower limit of the density of the fibers 5 per unit area of the front face of the substrate layer 2 is preferably 100 fibers/cm$^2$, more preferably 300 fibers/cm$^2$, and particularly preferably 500 fibers/cm$^2$. On the other hand, the upper limit of the density of the fibers 5 is preferably 5000 fibers/cm$^2$, more preferably 4500 fibers/cm$^2$, and particularly preferably 4000 fibers/cm$^2$. If the density of the fibers 5 in the front face of the substrate layer 2 is lower than the above-described lower limit, the optical sheet 1 may not be able to sufficiently exhibit the directional diffusion function. On the other hand, if the density of the fibers 5 is at or above a certain level, extraneous foreign matters contaminating in the front face side of the substrate layer 2 can be trapped by the fiber layer formed by the plurality of fibers 5, and can be confined therein. This renders the contact of other members superposed on the face with the extraneous foreign matters difficult, which allows the reduction of damages of the other members. In contrast, if the density is higher than the above-described upper limit, production cost of the optical sheet 1 merely increases, but the improvement of the directional diffusion function cannot be attained.

The lower limit of the mean diameter of the fiber 5 is preferably 0.1 μm, more preferably 1 μm, and particularly preferably 2 μm. On the other hand, the upper limit of the mean diameter of the fiber 5 is preferably 50 μm, more preferably 40 μm, and particularly preferably 30 μm. If the mean diameter of the fibers 5 is less than the above-described lower limit, the optical sheet 1 may not be able to sufficiently exhibit the directional diffusion function. In contrast, if the mean diameter is greater than the upper limit, the light transmittivity of the optical sheet 1 may be lowered.

The lower limit of the mean length of the fibers 5 is preferably 1 μm, more preferably 5 μm, and particularly preferably 10 μm. Furthermore, the upper limit of the mean length of the fibers 5 is preferably 1 mm, more preferably 0.5 mm, and particularly preferably 0.1 mm. If the mean length of the fibers 5 is less than the above-described lower limit, it may be difficult for the fibers 5 to protrude from the adhesive portion 4, and the optical sheet 1 may not be able to sufficiently exhibit the directional diffusion function. In contrast, If the mean length is greater than the above-described upper limit, the thickness of the optical sheet 1 becomes large due to the relationship among their material entity, the mean diameter and the like of the fiber 5, which will conflict with requirement of reduction in thickness of the liquid crystal display devices. Furthermore, the fibers 5 bend and can not exhibit uniform light diffusibility and light transmittivity, which may cause lack in uniformity of the luminance in the liquid crystal display devices.

Furthermore, the ratio of the mean length to the mean diameter (aspect ratio) of the fiber 5 is preferably no less than 2 and no greater than 50. If the aspect ratio of the fiber 5 is less than the above-described lower limit, the electrostatic flocking processing method as mentioned above may not be able to be suitably performed. In contrast, if the aspect ratio of the fiber 5 is greater than above-described upper limit, fibers 5 bend and can not exhibit homogenous light diffusibility and light transmittivity, which may cause lack in uniformity of the luminance in liquid crystal display devices.

<Optical Function Layer>

The optical function layer 3 is composed of the adhesive portion 4 laminated on a smooth front face of the substrate layer 2, a plurality of fibers 5 protruding via the adhesive portion 4, and an air intervening among the plurality of fibers 5. Refraction difference between the fibers 5 and the air results in the exertion of the directional diffusion function of the optical sheet 1.

<Optical Sheet>

The total light transmittance of the optical sheet 1 is preferably no less than 20% and no greater than 99.99%, more preferably no less than 40% and no greater than 99.9%, and particularly preferably no less than 60% and no greater than 99%. If the total light transmittance is less than the above-described range, reduction of luminance of the liquid crystal display devices may occur.

The haze value of the optical sheet 1 is preferably no less than 50% and no greater than 99.99%, more preferably no less than 70% and no greater than 99.9%, and particularly preferably no less than 80% and no greater than 99%. If the haze value is less than the above-descld range, diffusion performance of the optical sheet 1 may become insufficient, which may cause lack in uniformity of the luminance in liquid crystal display devices.

The optical sheet 1 has the plurality of fibers 5 protruding from the front face side of the substrate layer 2, and can exert the directional diffusion function of condensing light in a normal direction of the front face while causing the fibers 5 to refract and diffuse a portion of the rays of light entering from the back face side of the substrate layer 2, and while further diffusing a portion of the rays of light toward the front face side of the substrate layer 2 to direct the rays of light in the protrusion direction of the fibers 5. In addition, the directional diffusion function can be controlled by way of the diameter, length, refractive index, and density of the fibers 5 and the like.

Moreover, if a comparatively flexible fibers are used as the fiber 5, even when the optical sheet 1 contacts with other members on the from face side of the optical sheet 1 and experiences a force in a surface direction at the time of storing and conveying the optical sheet 1 in piles and of assembling liquid crystal display devices, the plurality of fibers 5 undergo some kind of deformation (bending and the like) to absorb the force, and damages of the other members can be prevented. Moreover, if the fibers 5 have such flexibility, it is also less likely that the other members are damaged when the fibers 5 detach from the adhesive portion 4 and contact with the other members. As a result, factors responsible for damages of the other members can be drastically reduced.

<Method for Producing Optical Sheet>

Figure 2:
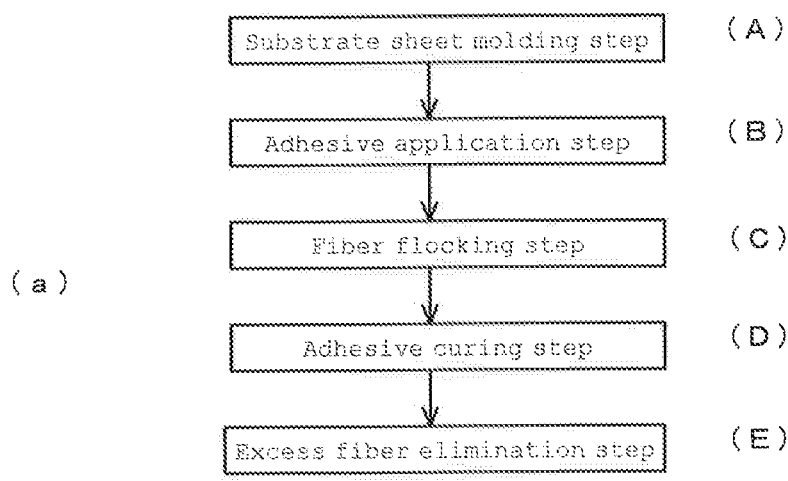
FIG. 2(a) is a flow diagram illustrating a method for producing the optical sheet shown in FIG. 1.
FIG. 2(b) is a schematic illustration showing the step (C)
Figure 2:
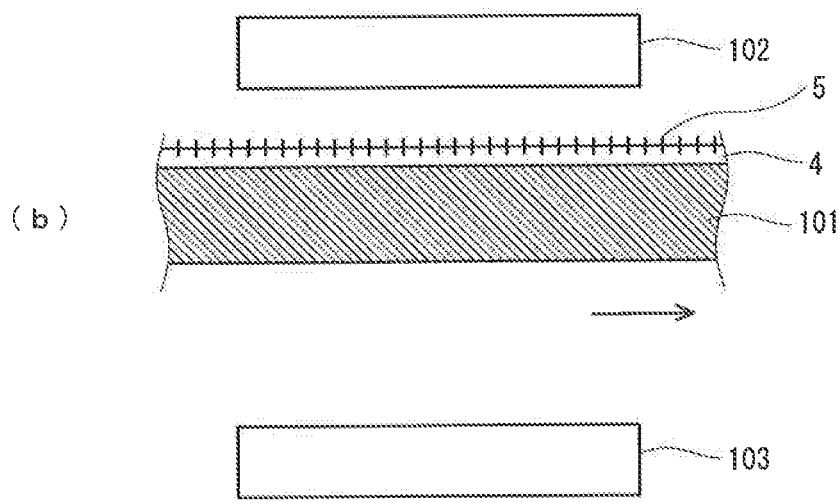

A method for producing the optical sheet 1 can include, without particular limitation, for example, a method including (A) a substrate sheet molding step of molding a sheet that constitutes the substrate layer (hereinafter referred to as a substrate sheet 101), (B) an adhesive coating step of coating an adhesive over a front face of the substrate sheet 101, (C) a fiber flocking step of flocking a plurality of fibers 5 on the adhesive-coated front face of the substrate sheet 101, (D) an adhesive curing step of curing the adhesive after the flocking, to form an adhesive portion 4, and (E) an excess fiber elimination step of eliminating excess fibers from the substrate sheet 101 after curing of the adhesive, as shown in FIG. 2(*a*).

The substrate sheet molding step is a step of forming the substrate sheet 101 in the form of an elongated sheet by molding an article by extrusion of molten thermoplastic resins from a T die, and then drawing the extrusion-molded article in a layer longitudinal direction and a layer width direction. Well-known extrusion molding methods employing the T die can include, for example, a polishing roll method and a chill roll method. In addition, drawing processing of the substrate sheet 101 is also possible, and well-known film drawing methods can include, for example, a biaxial drawing process for tubular films, a biaxial drawing process for flat films, and the like.

The adhesive coating step is a step of coating an adhesive over a front face of the substrate Sheet 101. The adhesive used in this step is in an uncured state. Any well-known method can be employed as means for coating the adhesive, including, for example, a spraying method by means of a spray gun, coating method by means of a rollcoater.

The fiber flocking step is a step of flocking the plurality of fibers 5 on the substrate sheet 101 such that they protrude from the substrate shoat 101, by arranging a fiber supply apparatus 102 on the flat front face side (the adhesive-coated surface) of the substrate sheet 101 so that the fiber supply apparatus 102 faces the substrate sheet 101, applying DC (direct-current) high voltage between the substrate sheet 101 and an electrode 103, causing the plurality of fibers 5 to fall from the fiber supply apparatus 102 to the substrate sheet 101, and penetrating the basal part of the fiber into the uncured adhesive by means of coulomb force, and thereby as shown in FIG. 2(*b*). Any well-known electrostatic flocking processing method can be used in this step as the flocking method without particular limitation, and aside from the downward method in which the plurality of fibers 5 are dropped from above the substrate sheet 101 as shown in FIG. 2(*b*), any of an upward method in which the plurality of fibers are flied upward from underneath, and a sideward method in which the plurality of fibers are flied from a lateral direction mar be used. Additionally, in the electrostatic flocking processing method, the flocking direction of the plurality of fibers can be adjusted by manipulating the direction of lines of electric force, and therefore the flocking may be performed in a state in which an elongated substrate sheet. 101 is bent; for example, the flocking may be performed in a state in is the substrate sheet 101 are wound in roll.

The adhesive curing seep is a step of curing the adhesive into which the basal parts of the plurality of fibers 5 are penetrated, to form the adhesive portion 4. When water soluble adhesives or solvent type adhesives are used, the adhesives may be cured via drying treatment. Any well-known drying treatment method can be used as means for the drying treatment, including, for example, a method using a hot air dryer. When ultraviolet ray curing adhesives are used, the ultraviolet ray curing adhesives may be cured by means of ultraviolet ray irradiation. Any well-known ultraviolet ray irradiation method can be used as means for the ultraviolet ray irradiation, including, for example, an ultraviolet ray irradiate method employing low pressure mercury lamps, high pressure mercury lamps, ultra-high pressure mercury lamps, metal halide lamps, at ray lasers or the like as a light source.

The excess fiber elimination step is a step of eliminating excess fibers that adheres on the surface of the substrate sheet 101 without being stuck thereon. Any well-known elimination method can be used as means for eliminating the excess fibers, including, for example, a method such as air blowing, excitation, and brushing. After the implementation of the excess fiber elimination step, the elongated substrate sheet 101 is cut to form the optical sheet.

According to the present method for producing the substrate sheet 101, it is possible to flock the plurality of fibers 5 on the front face of the substrate sheet 101, and moreover, to strongly stick the plurality of fibers 5 via the adhesive portion 4. Therefore, the optical sheet obtained by the present method can exhibit high directional diffusion function.

The backlight unit for liquid crystal display devices according to the present invention is provided with a rectangular optical waveguide plate, a lamp disposed along the long side edge of the optical waveguide plate, and a rectangular optical sheet superposed on the front face of the optical waveguide plate including a light diffusion sheet, a prism sheet, a micro lens sheet or the like, in which the optical sheet 1 is used as the light diffusion sheet. Since the optical sheet 1 has high optical function (directional diffusion function, uniformity of light transmittance, luminance and the like, economical efficiency and thin film character and the like, as described above, the backlight unit can drastically increase the utilization efficiency of rays of light emitted from the lamp, and promote luminance heightening, quality improvement, energy saving, and thin and light modeling, all of which are current social requirements.

Other Embodiments

The optical sheet according to the present invention is not limited to the above-described embodiments, and may be embodied as the following embodiments.

Figure 3:
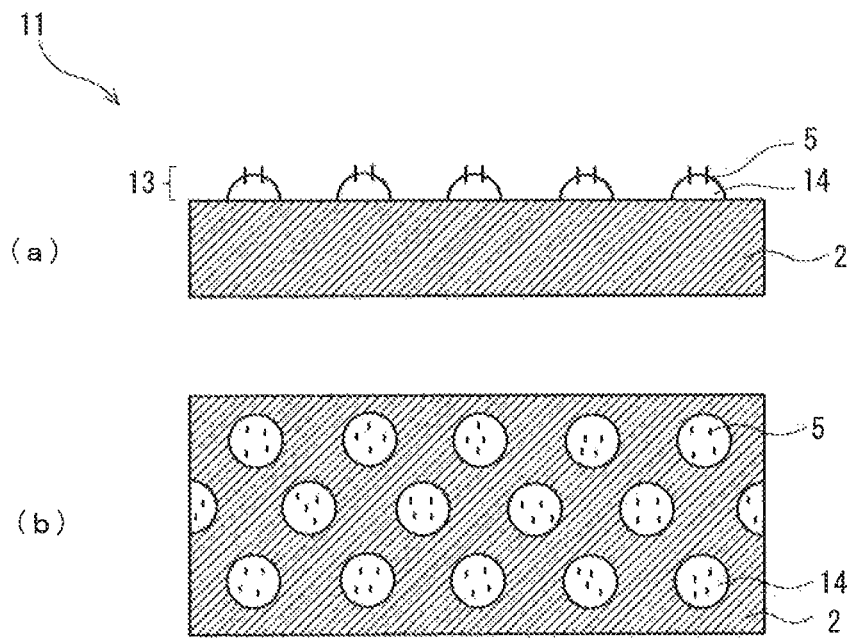
FIG. 3(a) is a schematic cross sectional view showing an optical sheet according to an embodiment different from the optical sheet of FIG. 1.
FIG. 3(b) is a schematic plan view of the optical sheet shown in FIG. 3(a), illustrating a state of coating at an adhesive portion.

The optical sheet 11 shown in FIG. 3 is a so-called light diffusion sheet, and is provided with a substrate layer 2, and an optical function layer 13 disposed on the front face of the substrate layer 2. The optical function layer 13 is composed of an adhesive portion 14, a plurality of fibers 5 protruding from the substrate layer 2 via the adhesive portion 14, an air intervening among the plurality of fibers 5. The substrate layer 2, the method for producing the sheet, the adhesive forming the adhesive portion 14 and materials for the fibers 5 and the like are the seine as in the optical sheet 1 shown in FIG. 1, and therefore the explanation thereof will be omitted.

The plurality of fibers 5 protrude via a plurality of adhesive portion 14 discretely provided on the front face of the substrate layer 2. The adhesive portion 11 is formed by providing an adhesive on the front face of the substrate layer 2 discretely (in an islet-like manner).

As shown in FIG. 3(*b*), since the adhesive portion 14 is discretely coated over the entire front face of the substrate layer 2, the amount of the adhesive coated can be reduced, compared to when the adhesive is coated entirely over the front face of the substrate layer 2, like, the adhesive portion 4 as shown in FIG. 1. As a result, the light transmittivity of the optical sheet 11 can be enhanced compared to the optical sheet 1 according to the above-described embodiment. The adhesive portion 14 is formed substantially evenly on the front face of the substrate layer 2. The number of the adhesive portion 14 and an area of each adhesive portion 14, as well as the number of the plurality of fibers 5 per adhesive portion are preferably determined so that the density of the fibers 5 per unit area of the front face of the substrate layer 2 falls within the above-described range. This enables the optical function of the optical sheet 11 to be suitably exhibited. It is to be noted that in FIGS. 3(a) and (b), although a plurality of fibers 5 are shown to be stuck to every adhesive portion 14, the number of the fiber 5 per adhesive portion 14 may be one. Moreover, as the method for flocking the plurality of fibers 5, the electrostatic flocking processing method may be employed in the same manner as the optical sheet 1 shown in FIG. 1

Figure 4:
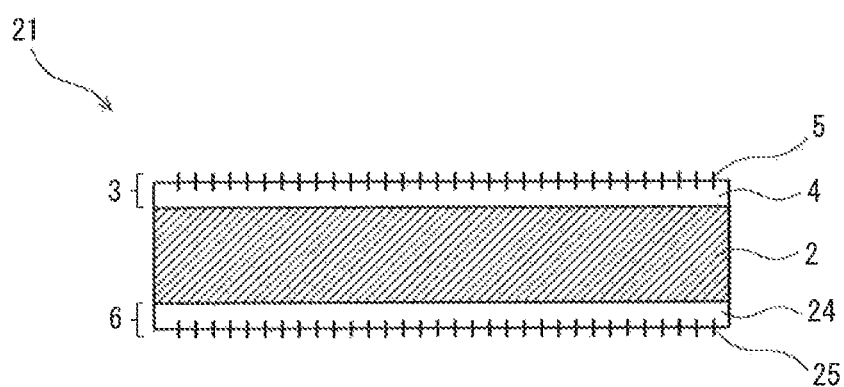
FIG. 4 is a schematic cross sectional view showing an optical sheet according to an embodiment different from the optical sheet shown in FIGS. 1 and 3.

The optical sheet 21 shown in FIG. 4 is a so-called light diffusion sheet, and is provided with a substrate layer 2, an optical function layer 3 disposed on the front face of the substrate layer 2, and an auxiliary function layer 6 disposed on the back face of the substrate layer 2. The optical function layer 3 is composed of an adhesive portion 4, a plurality of fibers 5 protruding from the substrate layer 2 via the adhesive portion 4, and an air intervening among the plurality of fibers 5. The auxiliary function layer 6 is composed of an adhesive portion 24, a plurality of fibers 25, and an air intervening among the plurality of fibers 25. The substrate layer 2 and the optical function layer 3 are the same as in the optical sheet. 1 shown in FIG. 1, and therefore the explanation thereof will be omitted.

The auxiliary function layer 6 is composed of an adhesive portion 24 laminated entirely on the smooth back face of the substrate layer 2, a plurality of fibers 25 protruding via the substrate portion 24, and an air intervening among the plurality of fibers 25. The plurality of fibers 25 are substantially uniformly planted on the adhesive portion 24, and protrude so that each fiber is substantially parallel to each other. The auxiliary function layer 6 has a function of diffusing the rays of light entering the back face of the substrate layer 2, and a function of preventing sticking with other members laminated on the back face side of the optical sheet 21. Materials similar to those for the adhesive portion 4 and the plurality of fibers 5 carried on the optical function layer 3 can be used for the adhesive portion 24 and the plurality of fibers 25.

The lower limit of the density of the fibers 25 per unit area of the back face of the substrate layer 2 is preferably 40 fibers/cm$^2$, more preferably 60 fibers/cm$^2$, and particularly preferable 80 fibers/cm$^2$. On the other hand, the upper limit of the density of the fibers 25 is preferably 5000 fibers/cm$^2$, more preferably 4000 fibers/cm$^2$, and particularly preferably 3000 fibers/cm$^2$. If the density of fibers 25 in the back face of the substrate layer 2 is lower than the above-described lower the optical sheet 21 may not be able to sufficiently exhibit the light diffusion function and sticking prevention function. On the other hand, if the density of the fibers 25 is at or above a certain level, extraneous foreign matters contaminating in the back face side of the substrate layer 2 can be trapped by the fiber layer formed by the plurality of fibers 25, and can be confined therein. This renders the contact of other members superposed on the face with the extraneous foreign matters difficult, which allows the reduction of damages of the other members. In contrast, the density is higher than the above-described upper limit, production cost of the optical sheet 21 merely increases, but the improvement of the light diffusion function and the sticking prevention function cannot be attained.

Since the optical sheet 21 is provided with the auxiliary function layer 6 on the back face of the substrate layer 2, and thereby the plurality of fibers 25 carried on the auxiliary function layer 6 diffuse the rays of light entering the optical sheet 21, and further, the plurality of fibers 5 carried on the optical function layer 3 of the front face of the substrate layer 2 diffuse and condense the rays of light, the optical sheet 21 exhibits high directional diffusion function. In addition, since sticking between the optical sheet 21 and other members laminated on the back face side is prevented by the contact of the plurality of fibers 25, lack in uniformity of the luminance in a screen of the liquid crystal display devices can be suppressed.

The optical sheet and backlight unit according to the present invention are not limited, to above-described embodiments. Intended usages of the present optical sheet are not limited to the above-described light diffusion sheet, and the present optical sheet can be used as other optical sheets, for example, an optical waveguide plate, alight condensing sheet and the like.

Figure 5:
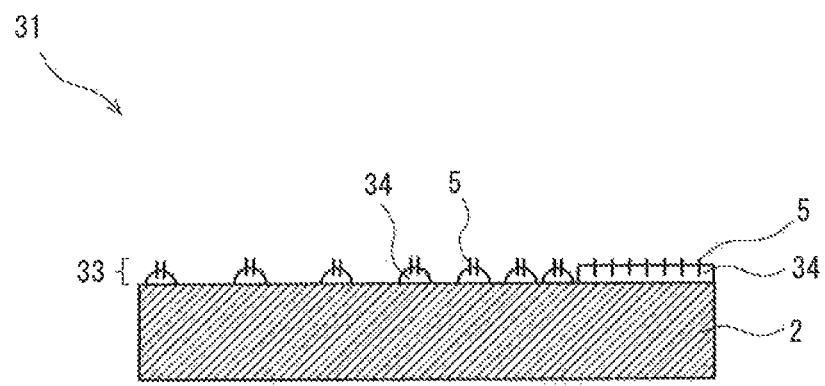
FIG. 5 is a schematic cross sectional view showing an optical sheet according to an embodiment different from the optical sheet shown in FIGS. 1, 3 and 4.

The optical sheet 31 shown in FIG. 5 is to so-called optical waveguide plate for an edge light, and is provided with a substrate layer 2, and an optical function layer 33 disposed on the front face of the substrate layer 2. The optical, function layer 33 is composed of an adhesive portion 34, a plurality of fibers 5 protruding from the subs crate layer 2 via the adhesive portion 34, and an air intervening among the plurality of fibers 5. The substrate layer 2 is the same as in the optical sheet 1 shown in FIG. 1 above, and the explanation thereof will be omitted.

The adhesive portion 34 is discretely provided on the front face side of the substrate layer 2, and the plurality of fibers 5 protrude from the adhesive portion 34. Specifically, the adhesive portion 34 is provided as dots in the front face of the substrate layer 2 on an edge side adjacent to the edge light, and the adhesive portion 34 is provided in such a manner that the area fraction of the adhesive portion 34 increases toward the other edge side, and on the other edge side, the adhesive portion 34 is provided substantially as a band. Furthermore, the fibers 5 protrude from the adhesive portion 34 in a substantially equal density.

The rays of light entering the optical sheet 31 from the edge light through the lateral face of the sheet spread within the optical sheet with reflecting on the front face and back face of the substrate layer 2, and when the rays of light, hit the plurality of fibers 5 protruding from the adhesive portion 34 provided as described above, the rays of light are diffused and condensed by the fibers 5 toward the front face side of the optical sheet 31, and then are output. In portions near the edge light, the density of the adhesive portion 34 (the fibers 5) is low and the amount of the output light is small, whereas the farther from the edge light, the higher the density of the fibers 5 is, and hence the Larger the amount of the output light is. As a result, the rays of light output from the edge light are output uniformly from the entire front face of the optical sheet.

The optical sheet 31 can convert a line light source from the edge light into a surface light source through the optical function layer 33 having the adhesive portion 34 and the plurality of fibers 5 as described above, and output it to the liquid crystal display element side.

The optical sheet according to the present invention can also be used as a light condensing sheet. The optical sheet according to the present invention can be used as an optical sheet having light condensing effect by disposing the optical function layer on the front face side of the substrate layer, and adjusting the direction, length, diameter and the like of the fibers protruding from the front face side of the substrate layer so that the rays of light entering the optical sheet are output in a certain definite direction.

Furthermore, the optical sheet may include, in addition to the substrate layer, at least one other layers such as an antistatic agent layer, an ultraviolet ray absorbing agent layer, a topcoat layer, and an easy-adhesive layer in the sheet main body.

Moreover, in the method for sticking is plurality of fibers, the basal part of the fibers may be directly joined to the substrate layer without using the adhesives. For example, there may be employed a method in which the substrate layer is molded, followed by flocking the plurality of fibers on the substrate layer before the complete curing of the substrate layer, or the like.

Furthermore, the optical sheet can be used in other liquid crystal display devices than the backlight unit. Examples of other liquid crystal display devices than the backlight unit can include, for example, projection-type liquid crystal display devices which project pictures onto a screen.

EXAMPLES

Hereinbelow, the present invention will be described in more detail with reference to the following Examples, but the present invention is not limited thereto.

Example 1

An adhesive ("E263" from Dainichiseika Color & Chemicals Mfg. Co., Ltd.) was coated over a front face of a substrate layer via a rollcoater method, polyamide fibers were flocked by an electrostatic flocking processing. The material entity of the substrate layer is polyethylene terephthalate, and its thickness is 100 μm. The density of the fibers in the substrate layer surface is 3500 fibers/cm$^2$, their mean diameter is 10 μm, and their mean length is 50 μm.

The optical sheet according to Example 1 was exposed to a backlight, and total light transmittance was measured in accordance with JIS K7361, to yield the total light transmittance of 79%. Moreover, haze value was measured in accordance with JIS K7105, to yield the haze value of 86%.

Example 2

The same substrate layer and adhesive were used as in Example 1, polyester fibers were flocked by the electrostatic flocking processing. The density of the fibers in the substrate layer surface is 3000 fibers/cm$^2$, their mean diameter is 10 μm, and their mean length is 50 μm.

The optical sheet according to Example 2 was exposed to a backlight, and total light transmittance was measured in accordance with JIS E17361, to yield the total light transmittance of 82%. Moreover, haze value was measured in accordance with JIS K7105, to yield the haze value of 87%.

Example 3

The same substrate layer and adhesive were used as in Example 1, cellulose fibers were flocked by the electrostatic flocking processing. The density of the fibers in the substrate layer surface is 3500 fibers/cm$^2$, their mean diameter is 10 μm, and their mean length is 50 μm.

The optical sheet according to Example 3 was exposed to a backlight, and total light transmittance was measured in accordance with JIS K7361, to yield the total light transmittance of 85%. Moreover, haze value was measured in accordance with JIS K7105, to yield the haze value of 87%.

Comparative Example 1

The same substrate layer was used as in Example 1, and 100 parts by mass of acrylic beads ("MBX-10" from Sekisui Plastics Co., Ltd.), 100 parts by mass of an acrylic binder ("UWR S2840" from Nippon Shokubai Co., Ltd.), 20 parts by mass of an isocyanate curing agent ("CORONATE HL" from Nippon Polyurethane Industry Co., Ltd.) were blended in such a proportion, and the blended product was coated to a front face of the substrate layer via the rollcoater method.

The optical sheet according to Comparative Example 1 was exposed to a backlight, and total light transmittance was measured in accordance with JIS K7361, to yield the total light transmittance or 70%. Moreover, haze value was measured in accordance with JIS K7105, to yield the haze value of 88%.

Comparative Example 2

The same substrate layer was used as in Example 1, and a blended product of the same acrylic beads, acrylic binder, isocyanate curing agent as in Comparative Example 1 was coated to a front face of the substrate layer via the rollcoater method. However, the blending ratio of the ingredients was as follows 200 parts by mass of the acrylic beads, 100 parts by mass of the acrylic binder, and 20 parts by mass of the isocyanate curing agent.

The optical sheet according to Comparative Example 2 was exposed to a backlight, and total light transmittance was measured in accordance with JIS K7361, to yield the total light transmittance of 65%. Moreover, haze value was measured in, accordance with JIS K7105, to yield the haze value of 92%.

[Quality Evaluation]

Figure 6:
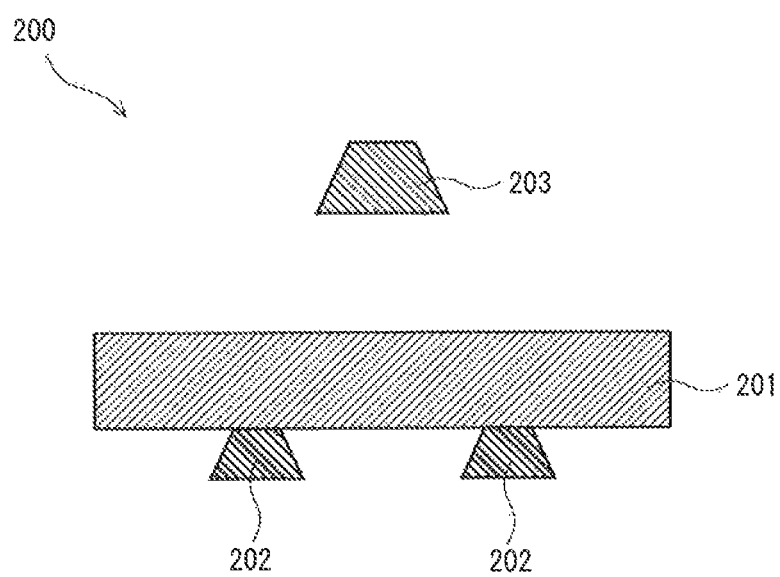
FIG. 6 is a schematic illustration showing an apparatus for measuring luminance of the optical sheet.
Figure 7:
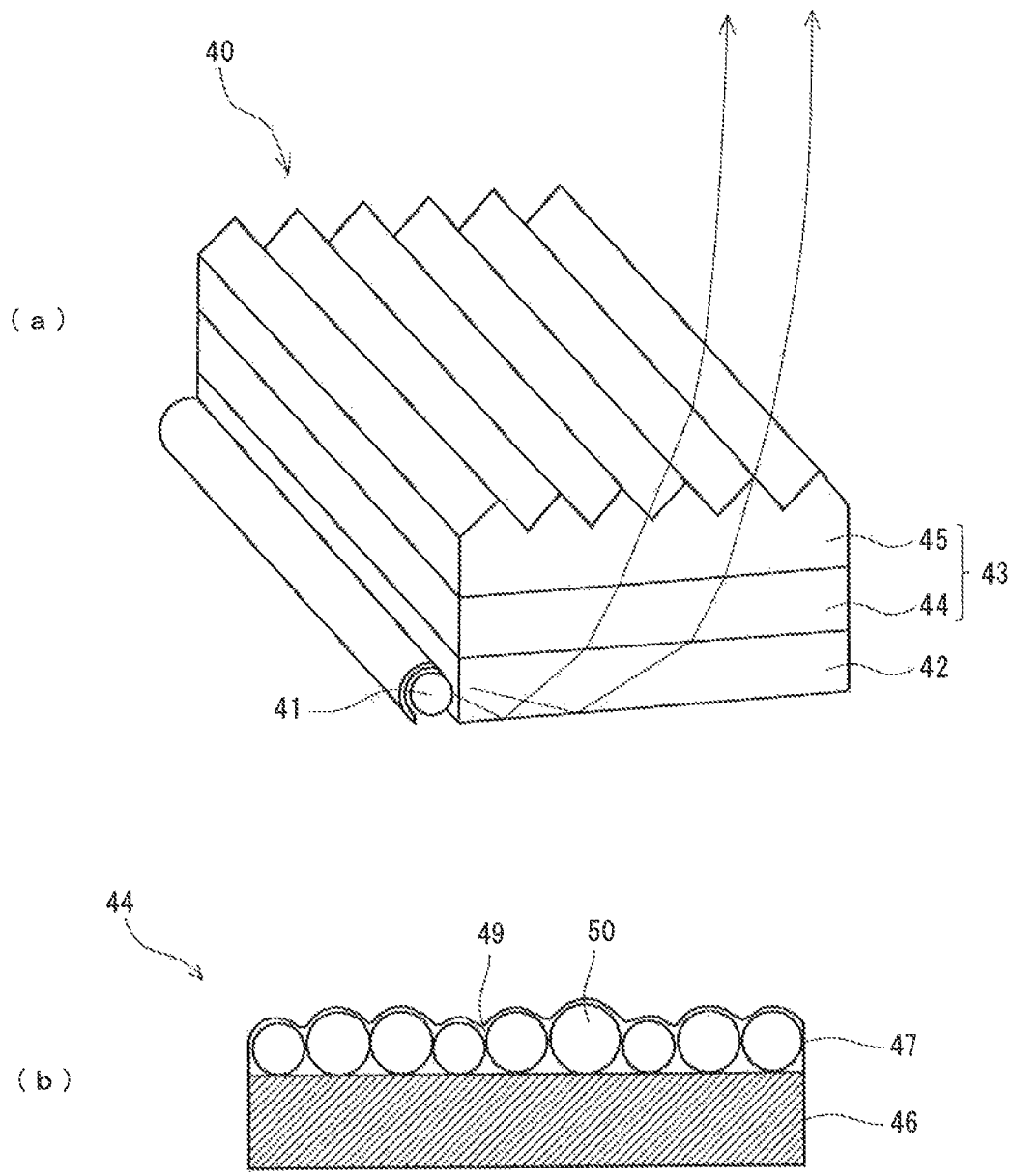
FIG. 7(a) is a schematic perspective view illustrating a common edge light type backlight unit.
FIG. 7(b) is a schematic cross sectional view of a common light diffusion sheet.

Luminance was measured with a luminance colorimeter ("BM-7" from TOPCON CORPORATION). Specifically, as shown in FIG. 6, two linear LED light sources 202 were disposed on the inferior face of the optical sheet 201, the luminance colorimeter 203 was arranged on a superior face of the optical sheet 201, and the luminance and Hotspot ratio were evaluated.

The Hotspot ratio represents a ratio of luminance at a site without the light source (minimum luminance) to luminance directly above the light source of the LED light, source (maximum luminance), and is calculated as minimum luminance/maximum luminance×100. Specifically, in the luminance measuring apparatus 200 shown in FIG. 6, the luminance at a site directly above the LED light source 202 and the luminance at the midpoint of the two LED light sources 202 were respectively measured, and these luminance were used as the maximum luminance and the minimum luminance, respectively, to calculate the Hotspot ratio. The Hotspot ratio represents the degree of difference in brightness between sites of the optical sheet. In other words, higher diffusibility of the optical sheet yields higher Hotspot ratio.

For each Example and Comparative Example, the luminance ratio with respect to the luminance of Example 1 (100%), and measurement results of the Hotspot ratio are shown in Table 1 below.

TABLE 1

| | total light transmittance % | haze value % | luminance cd/m$^2$ | luminance ratio % | Hotspot ratio % |
|---|---|---|---|---|---|
| Example 1 | 79 | 86 | 5268 | 100.0 | 85 |
| Example 2 | 82 | 87 | 5296 | 100.5 | 87 |
| Example 3 | 85 | 87 | 5336 | 101.3 | 86 |
| Comparative Example 1 | 70 | 88 | 5217 | 99.0 | 77 |
| Comparative Example 2 | 65 | 92 | 5242 | 99.5 | 83 |

As indicated from the results in Table 1, the optical sheets according to Examples 1 to 3 have higher luminance and Hotspot ratio, compared to the optical sheets according to Comparative Examples 1 and 2 both of which employ the conventional beads. In other words, the optical sheets according to Examples 1 to 3 have higher light diffusibility and face luminance, and less lack in uniformity of the luminance, and exhibit performances suitable as a member of a backlight unit for liquid crystal display devices, compared to the conventional optical sheets. It can be assumed that this is because the fibers carried by the sheets according to Examples 1 to 3 exert the effect of condensing the rays of light entering from the LED light source in one direction while spreading the rays of light throughout the sheet.

INDUSTRIAL APPLICABILITY

As described above, the optical sheet according to the present invention is useful as a member of a backlight unit for liquid crystal display devices, and in particular, can be suitably used for transmissive liquid crystal display devices.

1, 11, 21, 31 optical sheet
2 substrate layer
3, 13, 33 optical function layer
4, 14, 24, 34 adhesive portion
5, 25 fiber
101 substrate sheet
102 fiber supply apparatus
103 electrode
200 luminance measuring apparatus
201 optical sheet
202 LED light source
203 luminance colorimeter

What is claimed is:

1. An optical sheet, comprising:
   a transparent substrate layer; and
   an optical function layer provided on one surface side of the substrate layer;
   and wherein the optical function layer comprises a plurality of fibers, and the plurality of fibers are protruding be substantially parallel to each other,
   wherein the optical function layer comprises an adhesive portion joining the plurality of fibers to the substrate layer; and
   wherein a mean diameter of the fibers is no less than 0.1 μm and no greater than 50 μm, a mean length of the fibers is no less than 1 μm and no greater than 1 mm, and a ratio of the mean length to the mean diameter is no less than 2 and no greater than 50.

2. The optical sheet according to claim 1, wherein the adhesive portion is laminated entirely on the one surface side of the substrate layer.

3. The optical sheet according to claim 1, wherein the one surface side of the substrate layer comprises a region in which the adhesive portion is discretely provided.

4. The optical sheet according to claim 1, wherein the adhesive portion is formed from an acryl emulsion adhesive.

5. The optical sheet according to claim 1, wherein the refractive index of the fibers is no less than 1.3 and no greater than 1.8.

6. The optical sheet according to claim 1, wherein the density of the fibers per unit area in the plane direction of the substrate layer is no less than 100 fibers/cm$^2$ and no greater than 5000 fibers/cm$^2$.

7. The optical sheet according to claim 1, wherein the total light transmittance of the optical sheet is no less than 20%.

8. The optical sheet according to claim 1, wherein the haze value of the optical sheet is no less than 50%.

9. The optical sheet according to claim 1, wherein a plurality of fibers further protrude from the other surface side of the substrate layer.

10. A backlight unit for a liquid crystal display device, the backlight unit directing rays of light emitted from a lamp to a liquid crystal displaying part, wherein the backlight unit comprises the optical sheet according to claim 1.

11. The optical sheet according to claim 1, wherein the plurality of fibers provide directional diffusion so as to condense the rays of light in a normal direction while diffusing the rays of light toward another surface side opposite said one surface side, thereby providing a fiber optics function.

12. A method for producing an optical sheet, the method comprising:
   coating an adhesive over one surface side of a transparent substrate layer, flocking a plurality of fibers on the adhesive-coated surface via an electrostatic flocking processing method, such that the plurality of fibers are protruding so as to be substantially parallel to each other
   curing the adhesive after the flocking to provide an optical function layer comprising the plurality of fibers which are provided on one surface side of the substrate layer and protruding so as to be substantially parallel to each other, and
   eliminating excess fibers from the sheet main body after curing of the adhesive, and
   wherein a mean diameter for said each one finer is no less than 0.1 μm and no greater than 50 μm, a mean length of said each one fiber is no less than 1 μm and no greater than 1 mm, and a ratio for said each one finer of the mean length to the mean diameter is no less than 2 and no greater than 50.

* * * * *

UNITED STATES PATENT AND TRADEMARK OFFICE
CERTIFICATE OF CORRECTION

PATENT NO. : 9,020,315 B2
APPLICATION NO. : 13/613818
DATED : April 28, 2015
INVENTOR(S) : Takahiro Tsuji It is certified that error appears in the above-identified patent and that said Letters Patent is hereby corrected as shown below:

In the Claims

At col. 15, line 38, Claim 1, change "are protruding be" to – are protruding so as to be –.
At col. 16, line 43, Claim 12, change "each one finer" to – each one fiber –; and at line 45, change "each one finer" to – each one fiber –.

Signed and Sealed this
Twenty-seventh Day of October, 2015

Michelle K. Lee
*Director of the United States Patent and Trademark Office*